United States Patent
Bürkle et al.

(10) Patent No.: US 11,964,539 B2
(45) Date of Patent: Apr. 23, 2024

(54) CONTROL DEVICE

(71) Applicant: Eberspächer catem GmbH & Co. KG, Herxheim (DE)

(72) Inventors: Kai-Fabian Bürkle, Hinterweidenthal (DE); Kurt Walz, Hagenbach (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 343 days.

(21) Appl. No.: 17/351,454

(22) Filed: Jun. 18, 2021

(65) Prior Publication Data
US 2021/0394585 A1    Dec. 23, 2021

(30) Foreign Application Priority Data

Jun. 22, 2020    (DE) ............... 10 2020 207 712.6

(51) Int. Cl.
*B60H 1/22*    (2006.01)
*H05B 1/02*    (2006.01)
*H05B 3/00*    (2006.01)

(52) U.S. Cl.
CPC .......... *B60H 1/2215* (2013.01); *H05B 1/0236* (2013.01); *H05B 3/0019* (2013.01); *H05B 2203/02* (2013.01)

(58) Field of Classification Search
CPC .. B60H 1/2215; H05B 1/0236; H05B 3/0019; H05B 2203/02
See application file for complete search history.

(56) References Cited

U.S. PATENT DOCUMENTS

| | | | | |
|---|---|---|---|---|
| 5,812,375 A | * | 9/1998 | Casperson | H05K 1/0204 361/720 |
| 2007/0052111 A1 | * | 3/2007 | Long | H01L 23/4093 257/785 |
| 2008/0186681 A1 | * | 8/2008 | Deck | H01L 23/4006 361/719 |
| 2009/0139983 A1 | * | 6/2009 | Luppold | B60H 1/2225 219/530 |

FOREIGN PATENT DOCUMENTS

| | | | | |
|---|---|---|---|---|
| DE | 25 30 157 | | 2/1977 | |
| DE | 196 00 619 | | 7/1997 | |
| DE | 197 12 099 | | 5/1998 | |
| DE | 100 34 572 | | 1/2002 | |
| DE | 10 2012 025 445 | | 6/2013 | |
| DE | 102012025445 A1 | * | 6/2013 | ........... B60H 1/2215 |
| EP | 1395098 | | 3/2004 | |
| EP | 2337425 | | 6/2011 | |
| EP | 1872986 | | 1/2012 | |
| EP | 2466989 | | 6/2012 | |
| EP | 3334242 | | 6/2018 | |

* cited by examiner

*Primary Examiner* — Janie M Loeppke
*Assistant Examiner* — Theodore J Evangelista
(74) *Attorney, Agent, or Firm* — Boyle Fredrickson S.C.

(57) ABSTRACT

A control device is disclosed for an electric heating device with a PTC element as an auxiliary heater in a motor vehicle. The control device has a control housing in which a printed circuit board, equipped with at least one power switch is provided. The power switch is applied against a cooling surface in a heat-conducting manner under pretension via an elastic pretensioning element. The pretensioning element is formed from an elongated piece of a soft-elastic plastic part extruded with at least one through-opening. Also disclosed is an electric heating device having such a control device.

11 Claims, 3 Drawing Sheets

CONTROL DEVICE

BACKGROUND OF THE INVENTION

1. Field of the Invention

The present invention relates to a control device, in particular for an electric heating device with a PTC element as an auxiliary heater in a motor vehicle.

2. Background of the Invention

Control devices, in particular for electric heating devices with a ceramic PTC element for heating motor vehicles, are sufficiently described in the prior art, for example in EP 1 872 986 A1 or EP 2 337 425 A1. A control device in such an electric heating device usually has a control housing which encompasses the control components and is provided with plug connections for connecting control signals and/or the power current to be controlled. The above described examples as well as the electric heating device of EP 3 334 242 A1 realize a concept in which the control device is provided integrally with the power section. The control device has at least one power switch that emits power loss during operation. This is usually supplied to the medium to be heated. Accordingly, the power switch is not only provided with a cooling element which dissipates the power loss and accordingly counteracts overheating of the power switch. Rather, the cooling element is thermally coupled with the fluid to be heated. For this purpose, the cooling element can be provided in a heating chamber, which is separated from the accommodation chamber of the control housing by a partition wall, in which the part of the cooling element abutting the power switch is accommodated. Usually, a partition wall is provided between the accommodation chamber of the control housing and the heating chamber, which delimits both the heating chamber and the accommodation chamber of the control housing. This control housing can also accommodate contact zones of PTC heating assemblies, which usually project into the heating chamber and comprise at least one PTC element. Thus, in the prior art, the interior of the control housing is also referred to as the connection chamber, since the contact zones in this chamber are electrically connected.

The above-mentioned features also apply to the realization of the control device according to the invention in an electric heating device with a ceramic PTC element as auxiliary heater.

Control devices in automotive engineering are subject to the conditions prevailing there. The control components inside the control device are subjected to considerable vibration. It goes without saying that the control housing must be as tight as possible so that neither dust nor moisture can penetrate the control housing. However, the installed components must not only be provided with vibration resistance. The aim is to achieve a construction that provides the desired functionality with as few components as possible. The components should be easy to manufacture, scalable and insensitive to handling in the course of production. The components must remain functional throughout the service life of the motor vehicle and despite the above-mentioned conditions.

The present invention is in particular concerned with the problem of applying the power switch in a thermally conductive manner under pretension against a cooling element. For this purpose, there has already been no lack of proposals in the prior art.

For example, EP 1 395 098 A1 discloses a control device of an electric heating device with a PTC element, in which a cooling element directly abuts in a heat conducting manner against a power switch mounted on a printed circuit board and protrudes from the printed circuit board on the side opposite the power switch. The cooling element and the power switch are embraced by a C-shaped spring claw which holds the two components applied against each other under pretension.

In the construction principle known from U.S. Pat. No. 5,812,375, the power switch is applied with the interposition of an electrically insulating film against the surface of a heat sink, which engages in an accommodation opening of a printed circuit board, to the strip conductors of which the power switch is electrically connected. On the side opposite the heat sink, an elastomeric component with a U-shaped cross-section abuts against the power switch and is supported on a housing cover of the control housing. For this purpose, the housing cover has a projection which is embraced by the pretensioning means, which is U-shaped in cross-section.

DE 100 34 572 A1 discloses a control device for an auxiliary heater of a motor vehicle, in which an at least partially elastic press projection projects from a housing cover and is provided opposite a cooling dome, which is coupled to the heating chamber in a heat-conducting manner. A power switch is arranged between the press projection and the cooling dome, which, with the interposition of a possibly elastic, heat-conducting, however, electrically insulating film, abuts against the cooling dome.

For vibration-free support of the printed circuit board on a housing base of a control housing, DE 196 00 619 A1 proposes a pretensioning means acting on the power switch in the form of an elastomer strip, which presses the power switch and intermediate layer of the printed circuit board against an outer edge of the control housing.

The solutions known from the prior art still leave something to be desired. The solution previously known from DE 196 00 619 A1 is not always applicable in practice, since this solution requires a raised edge area against which the printed circuit board abuts. In an electric heating device with a structural unit comprising a control section and a power section, the edge area of the control device is not always located below the edge area of the control housing.

Furthermore, a certain height must sometimes be bridged between the power switch and a housing cover so that the elastomer strip known from DE 196 00 619 A1 is unsuitable for applying the power switch under pretension against a cooling element.

In view of this, EP 2 466 989 A1, which stems from the present applicant, proposes a supporting structure which is provided between the housing cover and a printed circuit board and supports an elastic hold-down device made of a compressive plastic, which projects through the printed circuit board and abuts against a power switch in order to apply the latter under pretension against the cooling surface of a heat sink which is connected to the heating chamber in a heat-conducting manner.

The present invention intends to provide a control device which allows good heat transfer between the power switch and the cooling surface and which uses fewer components than the solution previously known from EP 2 466 989 A1, and which can thus be manufactured more easily and at lower cost.

SUMMARY

In order to solve the above problem, the present invention proposes a control device for an electric heating device having h a PTC element as an auxiliary heater in a motor vehicle. The control device includes a control housing and a printed circuit board provided in the control housing. The printed circuit board is equipped with at least one power switch. The power switch is applied against a cooling surface in a heat-conducting manner under pretension via an elastic pretensioning element.

In this solution, the pretensioning element comprises an elongated piece of a soft elastic plastic part extruded with at least one through hole.

The plastic part may be extruded by the meter. This allows the pretensioning element to be produced at low cost. The plastic material used to manufacture the pretensioning element can be silicone or another plastic material, in particular one that is heat-resistant and considerably compressible or deformable. With regard to heat resistance, the plastic may be a thermoset or an elastomer.

The pretensioning element has at least one through-hole. The through-hole extends in the direction of extrusion and thus in the longitudinal direction of the plastic part due to manufacturing tolerances. The at least one through-hole increases the ability of the pretensioning element to permanently store elastic pretensions by changing the shape of the plastic part. Thus, the application under pretension of the power switch against the cooling surface is not merely due to a pretensioning force resulting from the compressibility of the plastic part. Rather, the desired pretensioning force is set by specific shaping of the plastic pretensioning element in the form of a molded part. The pretensioning element can have several through-holes next to each other and/or one above the other in a direction essentially transverse to the direction of transmission of the pretensioning force. The through-hole can have any desired cross-sectional shape. The through-hole can be rectangular, round, oval, polygonal or irregular in cross-section.

The pretensioning element may be applied on the inside against a cover of the control housing, wherein the cover has a bulge that positively holds the pretensioning element. In this way, despite a relatively unspecific configuration, the pretensioning element is positively held and positioned by the cover above a printed circuit board inside the control housing, at least along its length.

The pretensioning element can also form form-fit surfaces which positively embrace the power switch and/or the printed circuit board, specifically mating surfaces of the printed circuit board. In the first alternative, the soft-elastic plastic part forms form-fit surfaces formed by extrusion, which interact with the contour of the power switch in order to position and fix it in the transmission direction of the pretensioning force below the pretensioning element. In the second alternative, it is assumed that the power switch is located on a side of the printed circuit board facing the actual heating chamber of the electric heating device, whereas the pretensioning element is supported against the cover of the control housing and is accordingly provided on the side of the printed circuit board opposite the heating chamber. Accordingly, the pretensioning force is not directly transmitted to the power switch. Rather, the pretensioning force is transmitted to the printed circuit board and from this to the power switch so that the power switch is applied under pretension in a heat-conducting manner against a cooling surface which is associated with a heat sink connected in a heat-conducting manner to the heating chamber. The further development relieves the mechanical load on the power switch to the extent that a pretensioning force does not result in any relative movement between the terminals of the power switch and the printed circuit board. Rather, the printed circuit board together with the power switch are kept under pretension in the direction of the cooling surface.

A power switch according to the present invention can, for example, be formed by a MOSFET or an IGBT. The application against the cooling surface can be made with the interposition of an electrically insulating film, for example a polyimide film, in order to electrically decouple the cooling surface from the power switch, but nevertheless allow good heat conduction from the power switch to the cooling surface.

The pretensioning element, which is configured as a molded plastic part, can apply several power switches arranged in a row next to each other on the printed circuit board under pretension against one or more cooling surfaces. Such a uniform molded part regularly bridges the gaps between adjacent power switches on the printed circuit board without achieving a pretension effect there. Such an elongated piece of the plastic part may project beyond the power switches on their respective outer sides so that the power switches are held positively and limited in the longitudinal direction of the elongated piece by the deformation associated with the pretension.

In an alternative configuration, the pretensioning element has a plurality of pretensioning bodies, each associated with a power switch. Each of the respective pretensioning bodies has at least one, typically more, of the aforementioned through-holes in an already previously discussed arrangement and alignment relative to the direction of transmission of the pretensioning force. These pretensioning bodies are integrated into a unitary pretensioning element. For this purpose, adjacent pretensioning bodies are connected to each other by a connecting web extending transversely to the respective through-hole. This connecting web can be deformed to adjust the transverse distance between the pretensioning bodies. This deformation compensates for any positional deviations of the power switches after mounting on the printed circuit board. With regard to good adaptability of the transverse distance between the individual pretensioning bodies, the connecting web may be in the form of an integral hinge.

The solution according to the invention offers the advantage that the pretensioning element can be manufactured as an extruded plastic part with specific dimensions. The quantity, alignment and arrangement of the through-hole relative to one another sometimes permits a fairly high degree of deformability or compressibility so that the molded part formed from plastic can be used in various control devices. Accordingly, the pretensioning element can be made available to the manufacturing process as a continuous product and installed in suitable elongated pieces as a pretensioning element in the control device.

Accordingly, the solution according to the invention can be realized at low cost. Endlessly fed material can be used on elongated pieces to form pretensioning elements of different control devices, which sometimes have different dimensional specifications with regard to the distance between the power switch and a control housing cover, against which the pretensioning element is supported, and/or with regard to the shape and number of power switches.

In particular, the individual pretensioning bodies can be configured to positively embrace a standard power switch, wherein the connecting web allows this configuration to be used even with differently configured control devices, insofar as the power switches may be provided in a row next to each other.

According to its parallel aspect, the present invention proposes an electric heating device with the features of claim 9. This electric heating device has, in the manner already known from EP 2 466 989 A1, a connection chamber and a heating chamber, wherein the connection chamber is encompassed by the control housing and the heating chamber is encompassed by the heater housing. A partition wall is provided between the connection chamber and the heating chamber. This partition wall usually forms both a closure of the heating chamber and a closure of the control housing. In view of this, the partition wall will hereinafter also be referred to as the base of the control housing. At least one PTC heating assembly projects from the partition wall into the heater housing as a heating fin. The PTC heating assembly can be accommodated in the partition wall with plug-in contact or otherwise positioned and fixed relative thereto. The PTC heating assembly has at least one PTC element and strip conductors electrically connected thereto for energizing the same with different polarity. The strip conductors are electrically connected in the control housing. For this purpose, they project into the connection chamber and can be in plug-in contact with the printed circuit board that also supports the power switch or another printed circuit board that is provided for grouping heating circuits comprising several PTC heating assemblies. A heat sink is exposed in the heating chamber, which is connected in a heat-conducting manner to a cooling surface provided in the connection chamber. The power switch is abutted against this cooling surface so that the power dissipated by the power switch can also be used to heat the fluid to be heated in the heating device. This fluid can be a liquid fluid or a gaseous fluid, in particular air.

The pretension is effected by the already previously discussed pretensioning element consisting of an elongated piece of a plastic part having at least one through-hole extending in the extrusion direction of the extruded elongated piece. This pretensioning element is usually supported on a housing cover, i.e. on the side opposite the partition wall, on an inner surface of the control housing encompassing the connection chamber. A housing cover usually provided there can have the aforementioned bulge for positive retention and fixing of the pretensioning element. The deformation of the sheet material, which usually forms the housing cover, also serves to stiffen the housing cover. Hence, the cooling element and thus the heat sink usually provided in the transmission direction of the pretensioning force in the extension of this cooling surface, can be provided at any desired location within the heating chamber. By deforming the cover of the control housing, its rigidity can be adjusted, even when a relatively thin sheet material is selected so that the pretensioning element can be placed at any desired position within the control housing.

BRIEF DESCRIPTION OF THE DRAWINGS

Further details and advantages of the present invention will be apparent from the following description in conjunction with the drawing. Therein.

DETAILED DESCRIPTION

Figure 1:
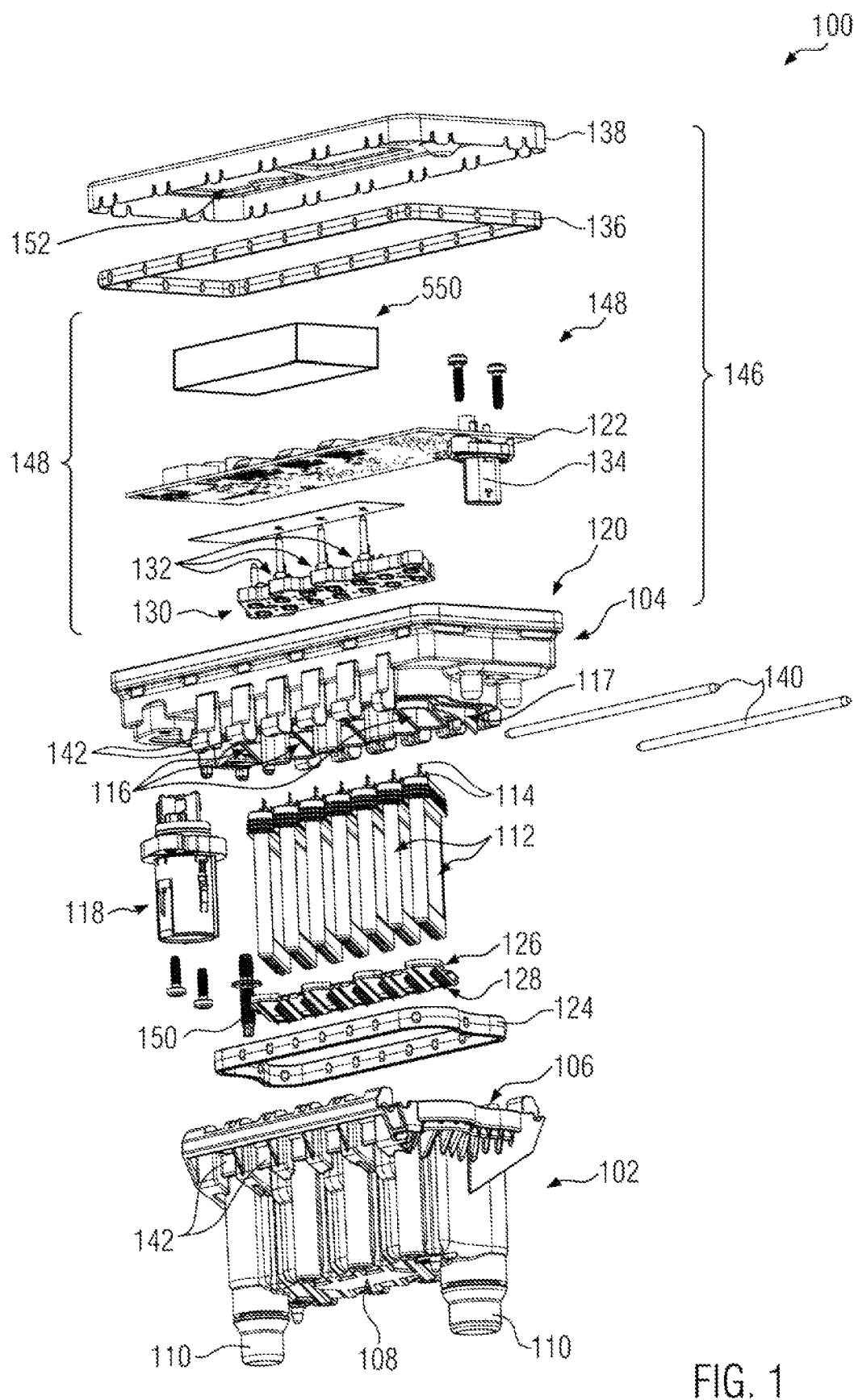
FIG. 1 shows a perspective exploded view of an embodiment of an electric heating device.

FIG. 1 shows an embodiment of an electric heating device 100 having a multi-part housing comprising a lower housing part 102 formed of plastic and a housing upper part 104 integrally formed of metal by means of die casting.

The housing lower part 102 is trough-shaped and encloses a heating chamber 106, to which inlet and outlet nozzles 110 projecting from a base 108 are provided. These inlet and outlet ports 110 are integrally formed with the lower housing part 102 by injection molding.

The inlet and outlet ports 110 project above the base 108, extending at right angles from a flat surface formed by the base 108.

A plurality of PTC heating assemblies 112 are shown in the Figure between the housing upper part 104 and the housing lower part 102, having PTC elements provided within the PTC heating assemblies 112 that are electrically contacted via strip conductors. The strip conductors are electrically connected via contact lugs 114. The PTC heating assemblies 112 are held in plug-in contact in receptacles 116 provided for this purpose in a partition wall 117 of the housing upper part 104. Details of this configuration are described in EP 3 334 242 A1 referring back to the applicant.

Further elements of the heating device 100 are shown between the lower housing part 102 and the upper housing part 104. Characterized by reference sign 118 is a high-voltage plug element which is screwed to the lower housing part 104 and has contact elements projecting into a connection chamber 120 of the upper housing part 104. These contact elements are electrically connected to a printed circuit board, characterized by reference sign 122, which can be accommodated in the trough-shaped housing upper part 104. Reference sign 124 characterizes a seal which seals the lower housing part 102 with respect to the upper housing part 104 and thus seals the heating chamber 106.

A retaining element 126 provided with elastic protrusions has heating assembly receptacles 128 individually accommodating each of the individual PTC heating assemblies 112, which engage with the outer peripheral surface of each of the individual PTC heating assemblies 112. In the assembled state, the retaining element 126 is also positively and/or frictionally engaged with the lower housing part 104.

A contacting device 130 is arranged above the housing upper part 104 and below the printed circuit board 122, which electrically connects all contact lugs 114 and groups individual PTC heating assemblies 112 into heating circuits. An electrical connection is made between the contacting device 130 and the circuit board 122 via contact lugs 132 projecting from the contacting device 130. A control signal plug element is shown with reference sign 134 connected to and projecting from the printed circuit board 122. This control signal plug element 134 is screwed against the printed circuit board 122.

Above the printed circuit board 122, another circumferential seal 136 and a control housing cover 138 are shown, by which the connection chamber 120 of the housing upper part 104 is covered and sealed.

After assembly, connecting rods 140 engage behind locking projections 142 which are provided on the lower housing part 102 and the upper housing part 104 in order to connect the two parts 102, 104 to one another positively and captively. Details in this respect are described in EP 2 796 804 A1.

The control housing cover 138, together with the housing upper part 104 and the seal 136, forms a control housing 146. In this context, the control housing cover 138 and the housing upper part 104, due to their metallic materials, form a shield around the control device 148 accommodated in this control housing 146, which is essentially formed by the printed circuit board 122. From the control housing 146 a terminal stud 150 projects in the direction of the plug elements 118, 134. This terminal stud 150 is used to connect the metal control housing 146 to a ground phase and is screwed to the control housing 146.

In FIG. 1, reference sign 152 characterizes a bulge of the control housing cover 138.

Figure 2:
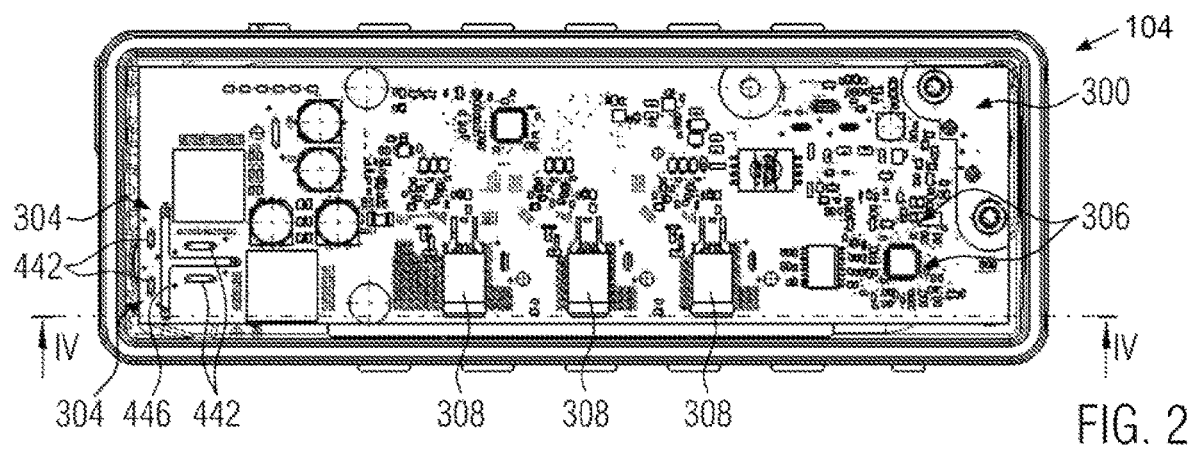
FIG. 2 shows a top view of a housing upper part provided with a printed circuit board.
Figure 3:
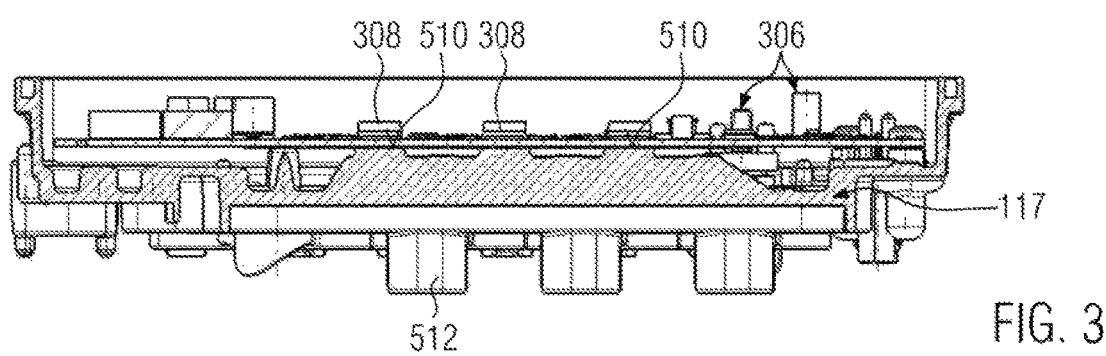
FIG. 3 shows a sectional view along line as shown in FIG. 2.

FIG. 3 shows the equipped printed circuit board 300 characterized there by reference sign 300, which is equipped on one side with components generally characterized by reference sign 306, also including power switches 308. As can be seen in FIG. 2 on the left, power current contact elements 442 of the high-voltage plug element 118 according to FIG. 1 are directly contacted in the printed circuit board 300, for which purpose the latter has contact lug receptacles 304. An insulating web, characterized by reference sign 446, is accommodated in a T-shaped receptacle of the printed circuit board 300 in order to increase the clearance and creepage distance between individual power current contact elements 442.

The power switches 308 abut flatly and with interposition of the printed circuit board 300 against cooling surfaces 510, which are formed by the housing upper part 104, in particular the partition wall 117. The printed circuit board 300 is modified in the region of the power switches 308 to be particularly heat-conducting. FIG. 3 already shows that a cooling dome 512 associated with the respective cooling surface 510 and forming a heat sink is offset to the right in FIG. 3 in each case. The cooling dome 512 is also offset slightly inwards and towards the heating chamber 106. The cooling dome 512 is formed as an elongated rib and is exposed within the heating chamber 106.

Figure 4:
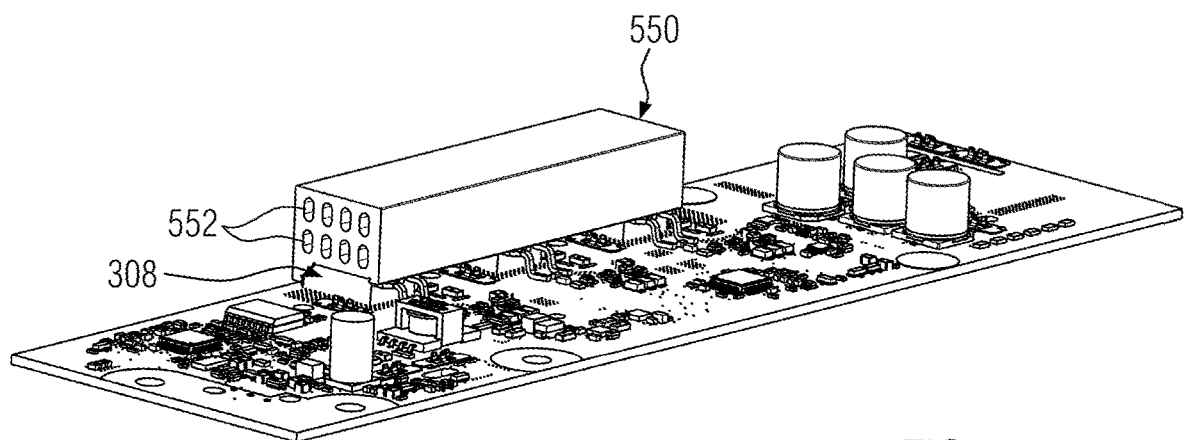
FIG. 4 shows a perspective top view of a printed circuit board.

FIG. 4 illustrates a first embodiment of a plastic part characterized by reference sign 550 and forming a pretensioning element in the meaning of the present invention. This plastic part 550 is separated from a semi-finished product and cut to length. The plastic part 550 projects above three power switches 308 provided on the printed circuit board 300. The plastic part 550 is manufactured by means of extrusion. The plastic part 550 is penetrated by a plurality of through-holes 552 extending longitudinally through the plastic part 550, and thus in the direction of extrusion, and accordingly forming continuous channels in the plastic part 550. In the embodiment, four through-holes 552 are provided in a lower row and four through-holes 552 are provided in a row thereabove, one above the other. Accordingly, two through-holes 552 are provided one above the other in the transmission direction of the pretensioning force striking the printed circuit board 300 at a right angle.

As FIG. 4 illustrates, the lower side of the plastic part 550 facing the power switch 308 is ramp-shaped to the outside and is provided with a projection to the inside so that the plastic part 550 abuts against an inclined surface of the power switch 308 and surrounds it positively on its inner surface facing the center of the printed circuit board 300. Thus, the plastic part 550 is fixed transversely to its longitudinal extension relative to the respective power switch 308.

In FIG. 4, the plastic part 550 ends in the longitudinal direction with the first or the last power switch 308 of the power switches 308 provided in series on the printed circuit board 300. When the control housing is closed, the plastic part 550 is circumferentially positively held in the bulge 152 of the control housing cover 138.

Figure 5:
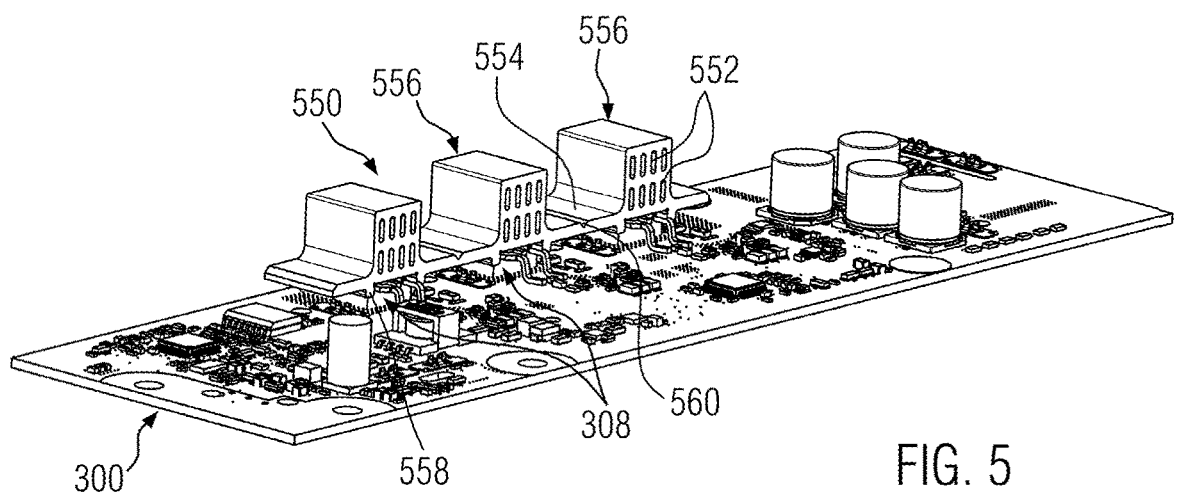
FIG. 5 shows a view according to FIG. 2 for an alternative configuration of a pretensioning element.

In the embodiment shown in FIG. 5, the extrusion direction of the plastic part 550 runs transversely to the longitudinal extension of the printed circuit board 300. Here, too, the through-holes 552 extend in the extrusion direction. The plastic part has three pretensioning bodies 556 connected to one another via connecting webs 554. The connecting webs 554 extend in a plane parallel to the circuit board 300. This plane is projected in the direction of the printed circuit board by limiting webs 558, which are provided in pairs for each pretensioning body 556, wherein the limiting webs 558 provided in pairs each accommodate the upper region of the power switch 308 between them and positively encompass it. It is apparent that the connecting webs 554 are connected to one another centrally by an integral hinge 560.

In the configuration shown in FIG. 5, the lateral distance between adjacent power switches 308 is selected such that the pretensioning bodies 556 are each arranged above the power switches 308 in the direction of transmission of the pretensioning force, wherein the limiting webs 558 extend essentially in a straight line between the pretensioning body 556. If the power switches 308 are disposed closer together, the result is a curvature of the connecting webs 554, wherein the webs can buckle at the height of the integral hinges 560. Thus, the lateral distance can be reduced without significant resistance by the plastic part 550. If the lateral distance of the power switches 308 increases, the uniform plastic part 550 can either be stretched in the area of the integral hinges 560, or, if necessary, also plastically stretched. Alternatively, the individual pretensioning bodies can be centrally separated from one another, thereby separating the plastic part 550, which was initially produced uniformly by extrusion, into individual pretensioning bodies 556.

The invention claimed is:

1. A control device for an electric heating device having a PTC element as an auxiliary heater in a motor vehicle, the control device comprising:
   a control housing; and
   a printed circuit board provided in the control housing, the printed circuit board being equipped with at least one power switch, wherein the power switch is applied against a cooling surface in a heat-conducting manner under a pretensioning force via an elastic pretensioning element, and wherein the pretensioning element is an elongated piece of a soft-elastic plastic part that is extruded with at least one through-hole extending in a direction substantially transverse to a transmission direction of the pretensioning force.

2. The control device according to claim 1, wherein the pretensioning element abuts internally against a control housing cover of the control housing, and wherein the control housing cover has a bulge circumferentially positively retaining the pretensioning element.

3. The control device according to claim 2, wherein the control housing cover is formed of a metal sheet, and wherein the bulge has a stiffening effect on the control housing cover.

4. The control device according to claim 1, wherein a plurality of through-holes are provided next to each other in a direction substantially transverse to a transmission direction of the pretensioning force.

5. The control device according to claim 1, wherein a plurality of through-holes are provided one above the other along a transmission direction of the pretensioning force.

6. The control device according to claim 1, wherein the pretensioning element forms form-fit surfaces that positively embrace the power switch and/or mating surfaces associated with the printed circuit board.

7. The control device according to claim 1, wherein the pretensioning element is provided between a plurality of power switches, and wherein a control housing cover and the plurality of power switches are held under pretension between the control housing cover and associated cooling surfaces.

8. The control device according to claim 7, wherein the pretensioning element has a plurality of pretensioning bodies, each of which is associated with one of the power switches and which are connected to one another via a connecting web extending transversely to the at least one through-hole.

9. The control device according to claim 8, wherein the connecting web forms an integral hinge.

10. An electric heating device comprising:
a control housing surrounding a connection chamber;
a heater housing surrounding a heating chamber, wherein the control housing and the heater housing are separated from one another by a partition wall, from which at least one PTC heating assembly projects into the heater housing as a heating fin, wherein the PTC heating assembly has at least one PTC element and contact lugs which are electrically conductively connected to the PTC element for energizing the PTC element with different polarities and which are electrically connected in the control housing, wherein a heat sink is exposed in the heating chamber, which heat sink is connected in a heat-conducting manner to a cooling surface provided in the connection chamber, wherein a printed circuit board, equipped with at least one power switch, is provided in the connection chamber, the power switch is applied in a heat-conducting manner against a cooling surface under a pretensioning force via an elastic pretensioning element, and wherein the pretensioning element is an elongated piece of a soft-elastic plastic part extruded with at least one through-opening extending in a direction substantially transverse to a transmission direction of the pretensioning force.

11. The electric heating device according to claim 10, wherein the pretensioning element acts indirectly on the power switch with the interposition of the printed circuit board therebetween.

* * * * *